(12) United States Patent
Xu et al.

(10) Patent No.: US 12,188,759 B2
(45) Date of Patent: Jan. 7, 2025

(54) DEPTH IMAGING METHOD AND DEVICE AND COMPUTER-READABLE STORAGE MEDIUM

(71) Applicant: ORBBEC INC., Guangdong (CN)

(72) Inventors: Yuhua Xu, Shenzhen (CN); Zhenzhong Xiao, Shenzhen (CN); Bin Xu, Shenzhen (CN); Yushan Yu, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 342 days.

(21) Appl. No.: 17/830,010

(22) Filed: Jun. 1, 2022

(65) Prior Publication Data

US 2022/0299314 A1    Sep. 22, 2022

Related U.S. Application Data

(63) Continuation of application No. PCT/CN2020/138118, filed on Dec. 21, 2020.

(30) Foreign Application Priority Data

Apr. 29, 2020 (CN) .......................... 202010357591.3

(51) Int. Cl.
*G01B 11/22* (2006.01)
*G01B 11/25* (2006.01)
*G06T 7/593* (2017.01)

(52) U.S. Cl.
CPC .............. *G01B 11/22* (2013.01); *G01B 11/25* (2013.01); *G06T 7/593* (2017.01); *G06T 2207/10152* (2013.01)

(58) Field of Classification Search
CPC ..... G01B 11/22; G01B 11/25; G01B 11/2513; G01B 11/2527; G06T 2207/10016; G06T 2207/10152; G06T 7/521; G06T 7/593
(Continued)

(56) References Cited

U.S. PATENT DOCUMENTS

2015/0062585 A1    3/2015 Blanton et al.
2015/0063674 A1    3/2015 Blanton et al.
(Continued)

FOREIGN PATENT DOCUMENTS

CN          103247038 A      8/2013
CN          103247053 A      8/2013
(Continued)

OTHER PUBLICATIONS

Huang Y(Machine translation of CN 103778643 A) (Year: 2014).*
(Continued)

*Primary Examiner* — Christopher S Kelley
*Assistant Examiner* — Ana Picon-Feliciano
(74) *Attorney, Agent, or Firm* — Sheppard Mullin Richter & Hampton LLP

(57) ABSTRACT

The specification provides a depth imaging method and device and a computer-readable storage medium. The method includes: controlling an emission module comprising a light emitting device to emit at least two speckle patterns that change temporally to a target object; controlling an acquisition module comprising a light sensor to acquire reflected speckle patterns of the at least two speckle patterns reflected by the target object; and performing spatial-temporal stereo matching by using the reflected speckle patterns and the at least two reference speckle patterns, to calculate offsets of pixel points between speckles of the at least two reference speckle patterns and speckles of the reflected speckle patterns, and calculating depth values of the pixel points according to the offsets.

13 Claims, 5 Drawing Sheets

(58) Field of Classification Search
USPC .......................................................... 348/46
See application file for complete search history.

(56) References Cited

U.S. PATENT DOCUMENTS

| | | | |
|---|---|---|---|
| 2019/0273906 A1 | 9/2019 | Xiao et al. | |
| 2021/0185298 A1 | 6/2021 | Xiao et al. | |

FOREIGN PATENT DOCUMENTS

| | | | | | |
|---|---|---|---|---|---|
| CN | 103778643 A | * | 5/2014 | | |
| CN | 104504688 A | | 4/2015 | | |
| CN | 104637043 A | | 5/2015 | | |
| CN | 104918035 A | | 9/2015 | | |
| CN | 107169418 A | | 9/2017 | | |
| CN | 107424188 A | * | 12/2017 | ......... | G01B 11/2513 |
| CN | 108171647 A | | 6/2018 | | |
| CN | 108307179 A | | 7/2018 | | |
| CN | 108333859 A | * | 7/2018 | ............ | G03B 17/54 |
| CN | 108765476 A | | 11/2018 | | |
| CN | 109087382 A | | 12/2018 | | |
| CN | 109410207 A | | 3/2019 | | |
| CN | 110221273 A | | 9/2019 | | |
| CN | 111664798 A | | 9/2020 | | |

OTHER PUBLICATIONS

Xiao Z(Machine translation of CN 107424188 A) (Year: 2017).*
Chen F(Machine translation of CN 108333859 A) (Year: 2018).*
PCT International Search Report and the Written Opinion mailed Mar. 1, 2021, issued in related International Application No. PCT/CN2020/138118, with partial English translation (10 pages).
First Search dated Jan. 5, 2021, issued in related Chinese Application No. 202010357591.3 (2 pages).
First Office Action dated Jan. 20, 2021, issued in related Chinese Application No. 202010357591.3, with English machine translation (15 pages).
Supplementary Search dated May 6, 2021, issued in related Chinese Application No. 202010357591.3 (2 pages).
Second Office Action dated May 13, 2021, issued in related Chinese Application No. 202010357591.3, with English machine translation (18 pages).
Third Office Action dated Aug. 9, 2021, issued in related Chinese Application No. 202010357591.3, with English machine translation (21 pages).
Jun-feng Sun et al., "On the measurement method of three-dimensional topography of object based on moving speckle", Journal of Experimental Mechanics, vol. 33, No. 5, Oct. 2018, pp. 751-756, with English abstract.

* cited by examiner

DEPTH IMAGING METHOD AND DEVICE AND COMPUTER-READABLE STORAGE MEDIUM

CROSS-REFERENCE TO RELATED APPLICATIONS

The application is a Continuation Application of International Patent Application No. PCT/CN2020/138118, filed on Dec. 21, 2020, which is based on and claims priority to and benefits of Chinese Patent Application No. 202010357591.3, filed with the China National Intellectual Property Administration on Apr. 29, 2020. The entire content of all of the above identified applications is incorporated herein by reference.

TECHNICAL FIELD

The specification relates to the field of three-dimensional imaging technologies, and in particular, to a depth imaging method and device and a computer-readable storage medium.

BACKGROUND

The structured light method is a proactive optical ranging technology. A basic principle of the structured light method is that a structured light projector projects a controllable speckle pattern or stripe pattern onto a surface of an object to be measured, an image is obtained by an image sensor, and based on a geometric relationship of a system, a depth of the object is calculated by using a triangulation method.

Current three-dimensional reconstruction technologies of structured light include a single-frame structured light reconstruction technology and a multi-frame structured light reconstruction technology. In the single-frame structured light reconstruction technology, in three-dimensional reconstruction methods of structured light based on speckle matching (such as methods used in Kinect V1, Orbbec Astra, and other products), speckle images of a target scene and prestored reference images are usually acquired for matching, to obtain a disparity map, and a depth or a three-dimensional structure of the target scene is calculated according to the disparity map and calibration parameters of a measurement system. Advantages of this method are that the costs are low and a higher frame rate can be obtained, so that this method is suitable for three-dimensional reconstruction of moving objects. A disadvantage of this method is that the measurement accuracy is limited.

In the multi-frame structured light reconstruction technology, the three-dimensional reconstruction method of structured light based on Gray code is widely applied. Generally, at least three frames of phase shift stripe patterns need to be projected onto a target scene. For a single-frequency phase shift map, only a relative phase can be obtained. Therefore, to obtain an absolute phase, a plurality of frames of phase shift maps with different frequencies further need to be projected. An advantage of this method is that the measurement accuracy is higher, so that this method is relatively suitable for high-accuracy three-dimensional reconstruction of static objects. Disadvantages of this method are that the structure of a transmitting end is complex and the algorithm is complicated, leading to relatively high costs.

The existing technologies lack a depth imaging method and device with high measurement accuracy and low costs.

The above content disclosed in the background is only used to assist in understanding the concepts and technical solutions of the specification, but does not necessarily belong to the existing technologies of the specification. In the absence of clear evidence that the above content has been disclosed on the filing date of the specification, the background should not be used to evaluate novelty and inventiveness of the specification.

SUMMARY

To resolve the existing problems, the specification provides a depth imaging method and device and a computer-readable storage medium.

To resolve the above problems, the technical solutions adopted by the specification are as follows.

A depth imaging method is provided, including controlling an emission module comprising a light emitting device to emit at least two speckle patterns that change temporally to a target object; controlling an acquisition module comprising a light sensor to acquire reflected speckle patterns of the at least two speckle patterns reflected by the target object; and performing spatial-temporal stereo matching by using the reflected speckle patterns and the at least two reference speckle patterns, to calculate offsets of pixel points between speckles of the at least two reference speckle patterns and speckles of the reflected speckle patterns, and calculating depth values of the pixel points according to the offsets.

In an embodiment of the specification, the light emitting device comprises a light source array comprising a plurality of discrete sub-light source arrays, and the discrete sub-light source arrays are grouped, and groups of the discrete sub-light source arrays are turned on independently, or the discrete sub-light source arrays are turned on synchronously, to emit the at least two speckle patterns that change temporally to the target object.

In another embodiment of the specification, light beams emitted from the emission module are deflected, to generate the at least two speckle patterns that change temporally.

In still another embodiment of the specification, the offsets of the pixel points are calculated according to normalized cross correlation (NCC) matching using a formula of $$ncc(x, y, d) = \frac{\sum_{i=1}^{K} \sum_{u,v \in \Omega(x,y)} (I_{i,O}(u, v) - \bar{I}_O)(I_{i,R}(u + d, v) - \bar{I}_R)}{\sqrt{\sum_{i=1}^{K} \sum_{u,v \in \Omega(x,y)} (I_{i,O}(u, v) - \bar{I}_O)^2 \sum_{i=1}^{K} (I_{i,R}(u + d, v) - \bar{I}_R)^2}}$$

where d is a disparity value, i is an image sequence index, ncc(x, y, d) represents an NCC value between image blocks in K different temporal speckle images centered around a pixel point (x, y) in reference speckle images $I_{i,R}$ and image blocks in K different temporal speckle images centered around a pixel point (x-d, y) in captured speckle images $I_{i,O}$, $\Omega(x, y)$ is a neighborhood centered around (x, y), and $\bar{I}_O$ is average pixel grayscale values in three-dimensional windows of the reference speckle images and $\bar{I}_R$ is average pixel grayscale values in three-dimensional windows of the captured speckle images; and the depth values of the pixel points are calculated based on the offsets using a triangulation of $$Z = \frac{Z_0}{1 + \frac{Z_0}{f \times b} \times d}$$

where b is a length of a baseline from a light source of the emission module to a camera of the acquisition module, $Z_0$ is a distance between a plane on which the emission module and the acquisition module are located and a reference plane, f is a focal length of the camera, and Z is a depth value of a pixel point.

In yet another embodiment of the specification, the speckle patterns are acquired by using a front-back-frame sequential acquisition method to calculate the depth values of the pixel points.

The specification further provides a depth imaging device, including: an emission module comprising a light emitting device, configured to emit at least two speckle patterns that change temporally to a target object; an acquisition module comprising a light sensor configured to acquire reflected speckle patterns of the at least two speckle patterns reflected by the target object; and a control and processing device, respectively connected to the emission module and the acquisition module, and configured to implement the method according to any one of the foregoing embodiments.

In an embodiment of the specification, the light emitting device comprises a light source array, and the light source array comprises a plurality of discrete sub-light source arrays, and the discrete sub-light source arrays are grouped, and groups of the discrete sub-light source arrays are turned on independently, or the discrete sub-light source arrays are turned on synchronously, to emit the at least two speckle patterns that change temporally.

In another embodiment of the specification, a light beam deflection unit connected to the emission module is configured to deflect light beams emitted from a light source array of the emission module to generate the at least two speckle patterns that change temporally. The light emitting device includes a light source and an optical element connected, and the optical element includes a lens or a diffractive optical element (DOE); and the light beam deflection unit is connected to one of the light source, the lens, or the DOE, and is configured to move or deflect the light source, the lens, or the DOE in a single direction or multiple directions.

The specification further provides a non-transitory computer-readable storage medium, storing a computer program, which, when executed by a processor, causes the processor to implement the steps of the method according to any one of the foregoing embodiments.

Beneficial effects of the specification are as follows: A depth imaging method, a device, and a computer-readable storage medium are provided. An emission module is controlled to emit at least two speckle patterns that change temporally. An acquisition module is controlled to acquire the reflected speckle patterns of the at least two speckle patterns reflected by a target object. Matching is performed by using the reflected speckle patterns and prestored reference speckle patterns to calculate offsets of pixel points, and depth values of the pixel points are calculated according to the offsets. The temporal information is added to a stereo matching method, and stereo matching is performed according to a spatial-temporal stereo matching principle by using three-dimensional windows, thereby achieving depth imaging with low costs, high accuracy, and a high frame rate.

Further, the specification provides a method for improving a software program of a control and processing device to achieve depth imaging with low costs, high accuracy, and a high frame rate.

Further, the specification provides a method for combining improvements in software and hardware to achieve depth imaging with low costs, high accuracy, and a high frame rate.

BRIEF DESCRIPTION OF THE DRAWINGS

FIG. 5($b$) is a schematic diagram of a principle of spatial-temporal stereo matching adopted, according to an embodiment of the specification.

DETAILED DESCRIPTION

To make the technical problems to be resolved by embodiments of the specification, and the technical solutions and beneficial effects of the embodiments of the specification clearer and more comprehensible, the following further describes the specification in detail with reference to the accompanying drawings and embodiments. It should be understood that the specific embodiments described herein are merely used to explain the specification but does not limit the specification.

It should be noted that, when an element is described as being "fixed on" or "disposed on" another element, the element may be directly located on the another element, or indirectly located on the another element. When an element is described as being "connected to" another element, the element may be directly connected to the another element, or indirectly connected to the another element. In addition, the connection may be used for fixation or circuit connection.

It should be understood that orientation or position relationships indicated by the terms such as "length," "width," "above," "below," "front," "back," "left," "right," "vertical," "horizontal" "top," "bottom," "inside," and "outside" are based on orientation or position relationships shown in the accompanying drawings, and are used only for ease and brevity of illustration and description of embodiments of the specification, rather than indicating or implying that the mentioned apparatus or component needs to have a particular orientation or needs to be constructed and operated in a particular orientation. Therefore, such terms should not be construed as limiting the specification.

In addition, terms "first" and "second" are used merely for the purpose of description, and shall not be construed as indicating or implying relative importance or implying a quantity of indicated technical features. In view of this, a feature defined by "first" or "second" may explicitly or implicitly include one or more features. In the descriptions of the embodiments of the specification, unless otherwise specified, "a plurality of" means two or more than two.

Figure 1:
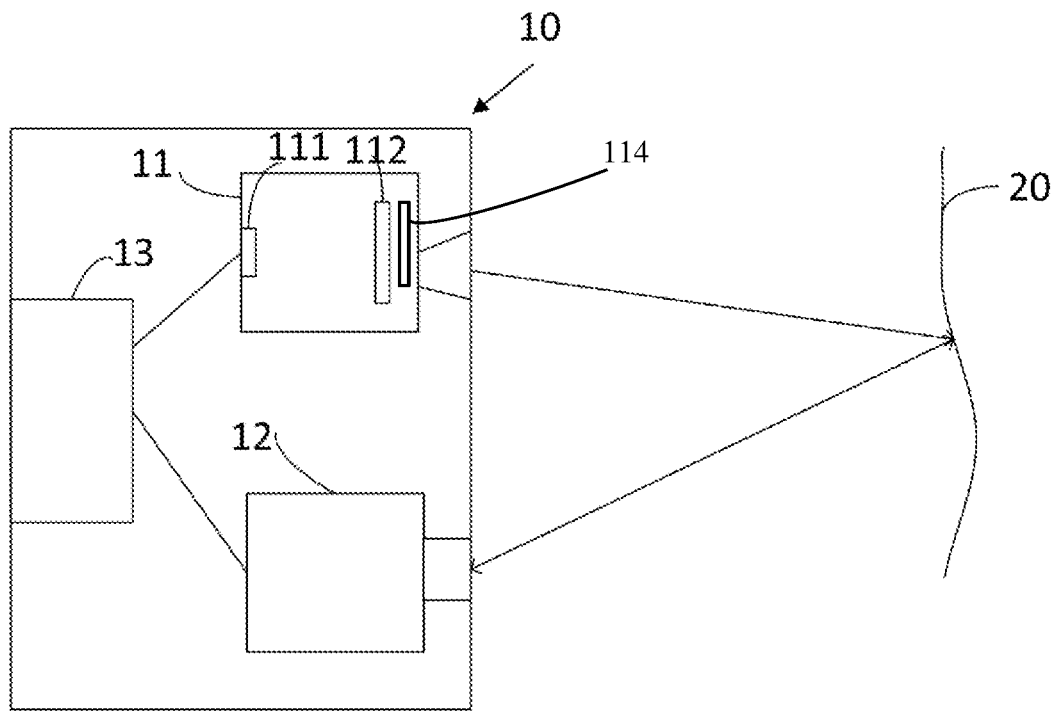
FIG. 1 is a schematic diagram of a structure of a depth imaging device, according to an embodiment of the specification.

FIG. 1 is a schematic diagram of a structure of a depth imaging device 10 based on temporal speckles, according to an embodiment of the specification. The depth imaging device 10 includes an emission module 11, an acquisition module 12, and a control and processing device 13 separately connected to the emission module 11 and the acquisition module 12. The emission module 11 comprises a light emitting device and is configured to emit at least two speckle patterns that change temporally to a target object 20. The acquisition module 12 comprises a light sensor and is configured to acquire the corresponding reflected speckle patterns of the at least two speckle patterns reflected by the target object 20. The control and processing device 13 is configured to perform spatial-temporal stereo matching by using the reflected speckle patterns and at least two prestored reference speckle patterns to calculate offsets of pixel points between speckles of the at least two prestored reference speckle patterns and speckles of the reflected speckle patterns, and calculate depth values of the pixel points according to the offsets. It may be understood that a disparity for emitting the at least two speckle patterns may be preset.

The emission module 11 includes a light source 111 and an optical element 112. The light source 111 may be a light source such as a light-emitting diode (LED), an edge-emitting laser (EEL), or a VCSEL, or may be an array light source including a plurality of light sources. Preferably, a plurality of VCSEL light sources are used to form a VCSEL array light source. Because the VCSEL has characteristics, such as a small volume, a small light source emission angle, and good stability, a plurality of VCSEL light sources can be simultaneously arranged on a semiconductor substrate. A VCSEL light source array chip formed in this way has a small volume and low power consumption, and is more conducive to generating spot pattern light beams. Moreover, because the plurality of VCSEL light sources have different spatial positions, speckle patterns corresponding to the plurality of VCSEL light sources are also different. In this way, speckle patterns that change temporally can be generated.

The light source array includes a plurality of discrete sub-light source arrays, and the discrete sub-light source arrays may be grouped and independently controlled. Through grouping, the control and processing device 13 independently controls the discrete sub-light source arrays of the emission module 11 to emit at least two speckle patterns that change temporally to the target object 20. The grouping and controlling include that the sub-light source arrays are independently or synchronously turned on.

Figure 2:
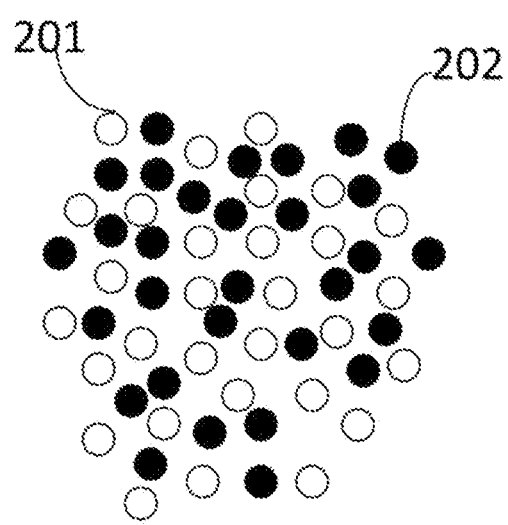
FIG. 2 is a schematic diagram of speckle patterns emitted by vertical-cavity surface-emitting laser (VCSEL) sub-arrays in an emission module, according to an embodiment of the specification.

FIG. 2 is a schematic diagram of a VCSEL light source array, according to an embodiment of the specification. In the embodiment shown in FIG. 2, a plurality of sub-light sources 201 (the light sources shown in hollow circles) jointly form a first sub-light source array. The first sub-light source array forms a first two-dimensional pattern, and can independently emit a first speckle pattern under the control of the control and processing device 13. A plurality of sub-light sources 202 (the light sources shown in solid circles) jointly form a second sub-light source array. The second sub-light source array forms a second two-dimensional pattern, and can independently emit a second speckle pattern under the control of the control and processing device 13 (e.g., a processor). In addition, the first sub-light source array and the second sub-light source array are spatially separated. The hollow circles 201 and the solid circles 202 in the figure are only for distinguishing, and both the hollow circles 201 and the solid circles 202 are light sources. In addition, all the hollow circles 201 are jointly controlled, and all the solid circles 202 are jointly controlled. That is, sub-light source arrays represented by the solid circles and the hollow circles may be independently controlled. The first two-dimensional pattern and the second two-dimensional pattern may be the same or different. It may be understood that the first sub-light source array and the second sub-light source array may alternatively be synchronously turned on to form a third two-dimensional pattern. The description herein is merely exemplary. The light source array may include a plurality of sub-light source arrays, and the sub-light source arrays may be individually turned on or two or more of the sub-light source arrays may be jointly turned on.

It may be understood that, the plurality of sub-light source arrays may be arranged separately, crosswise, and compounded in space. For example, the first sub-light source array is in a region A, the second sub-light source array is in a region B, and a third sub-light source array is in a region A+B. In addition, an arrangement manner of the plurality of sub-light source arrays may be set according to requirements, and patterns, quantities, densities, and arrangement manners of the sub-light source arrays may be the same or different. For example, an arrangement density of first sub-light sources is higher than that of second sub-light sources, a quantity of the first sub-light sources is less than that of the second sub-light sources. Because different arrangement manners result in an output of different speckle patterns, speckle patterns that change temporally can be generated.

The optical element 112 receives light beams from the light source 111, performs modulation such as diffraction or transmission on the light beams, and then emits modulated light beams to the target object 20. The optical element may be one or a combination of two or more of forms such as a lens, a DOE, and a microlens array, and is set according to specific usage scenarios.

In another embodiment of the specification, the depth imaging device 10 includes a light beam deflection unit 114 (e.g., one or more actuators 301 explained below) connected to the emission module. The light beam deflection unit 114 may be a specific piece of hardware or a combination of pieces of hardware, and is configured to deflect light beams emitted from the light source array of the emission module to emit the speckle patterns that change temporally to the target object 20. It may be understood that a deflection angle and a deflection time may be set according to specific requirements, and different speckle patterns that change temporally are generated by deflecting the emitted light beam. Details are as follows.

In an embodiment, the emission module 11 is connected to one or more actuators 301. The actuator 301 may be connected to either of the VCSEL array and the lens or DOE, and is configured to move or deflect the VCSEL array or the lens or DOE in a single direction or a plurality of directions, thereby generating speckle patterns that change temporally.

Figure 3:
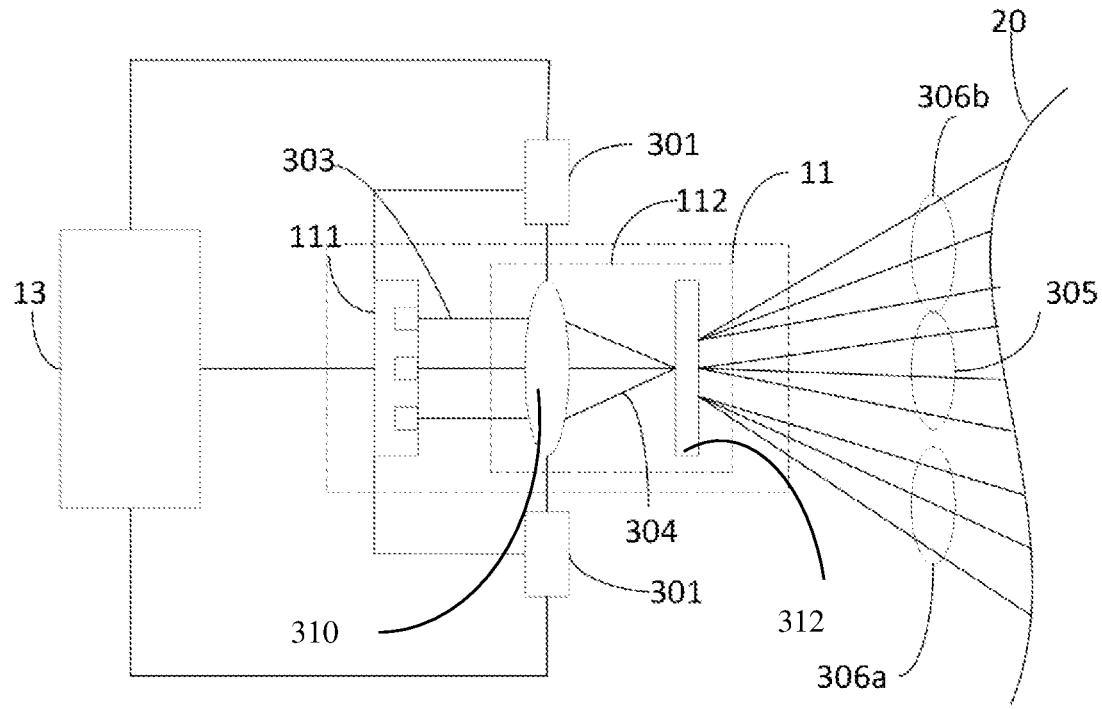
FIG. 3 is a schematic diagram of a structure of a first type of emission module, according to an embodiment of the specification.

As shown in FIG. 3, the VCSEL array emits a light beam 303. The lens 310 receives the light beam 303 and converges the light beam into a light beam 304. The DOE 312 receives the light beam 304 and diffracts the light beam 304 into a zeroth-order diffracted light beam 305, positive first-order diffracted light beams 306a, and negative first-order diffracted light beams 306b to form a speckle pattern. It may be understood that the zeroth-order diffracted light beam and the positive and negative first-order diffracted light beams are only used as an example herein for ease of description, and the DOE 312 may generate light beams into a larger quantity of diffraction orders. The actuator 301 is separately connected to the lens 310 and the control and processing device 13, and is configured to translate the lens 310 transversely along an optical axis of the lens, for the light beam 303 to be translated or deflected.

Figure 4:
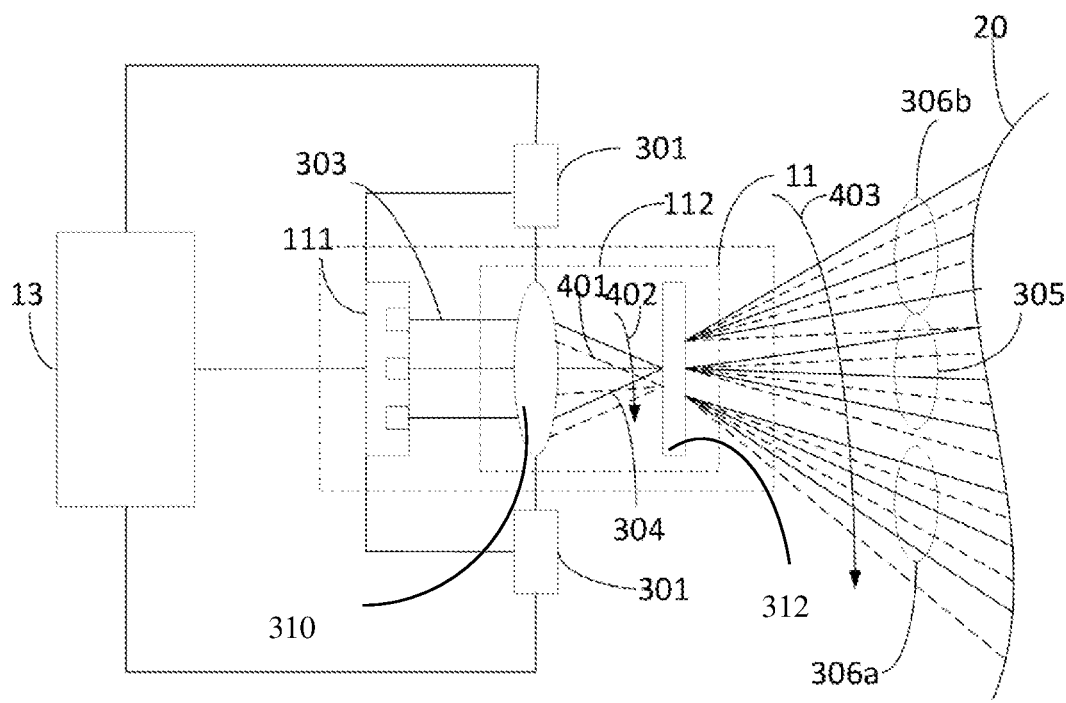
FIG. 4 is a schematic diagram of a structure of a second type of emission module, according to an embodiment of the specification.

As shown in FIG. 4, the actuator 301 is configured to translate the lens 310 to the right (e.g., downward in FIG. 4), and the light beam 304 rotates clockwise (as shown by an arrow 402 in the figure) for a specific angle θ to form a light beam 401. The angle is determined according to a ratio of a translation amount of the lens to a focal length of the lens. The rotation continues to be transferred to the DOE 312, and the zeroth-order diffracted light beam 305, the positive first-order diffracted light beams 306a, and negative first-order diffracted light beams 306b of the DOE 312 also rotate clockwise (as shown by an arrow 403 in the figure) for the specific angle θ, for the speckle pattern to transversely move, thereby achieving a temporal change effect. It may be understood that a diffraction order fulcrum also moves transversely, and a movement amount of the fulcrum can be omitted when compared with the deflection angle. In this embodiment, only rightward translation of the lens is used as an example, and actually the lens may alternatively move to the left or in other directions. The movement direction of the lens is not limited herein.

It may be understood that the description herein is merely exemplary. The deflection unit includes the hardware or hardware combination that is capable of achieving a function similar to that of the actuator, such as a function of a scanning component and a function of a beam splitter, and the hardware or the hardware combination with a suitable size may be selected in consideration of specific application scenarios.

In another embodiment of the specification, the emission module 11 emits at least two speckle patterns that change temporally to the target object 20, and the acquisition module 12 acquires the corresponding reflected speckle patterns reflected by the target object 20. The control and processing device 13 matches the reflected speckle patterns and prestored reference speckle patterns to calculate offsets of pixel points, and calculates depth values of the pixel points according to the offsets. It may be understood that the plurality of prestored reference speckle patterns are acquired by using a calibration process. That is, a flat plate is placed at one or more preset distances, then a speckle pattern is projected onto the flat plate, and the acquisition module 12 acquires the speckle pattern and stores the speckle pattern in a memory (not shown).

Figure 5A:
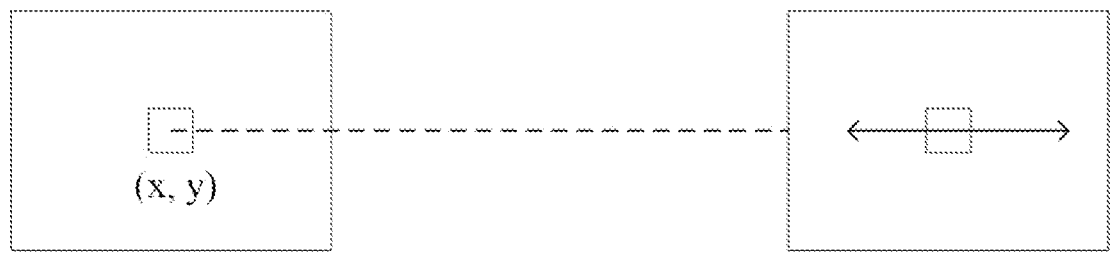
FIG. 5($a$) is a schematic diagram of a stereo matching principle of a general stereo matching technology, according to an embodiment of the specification.
Figure 5B:
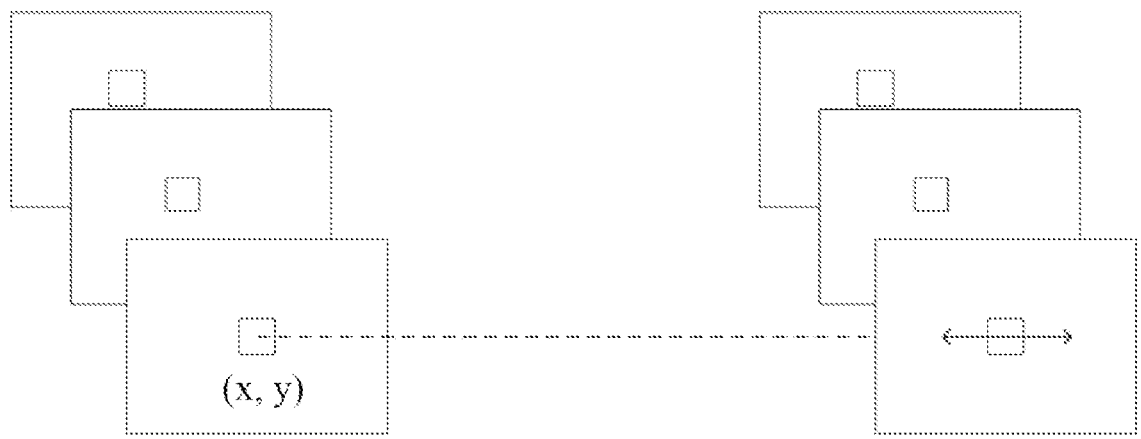

FIG. 5(a) is a schematic diagram of stereo matching in a general stereo matching technology, and FIG. 5(b) is a schematic diagram of spatial-temporal stereo matching according to embodiments of the specification. The commonly used stereo matching technology in the existing technologies is to establish a point correspondence between a pair of stereo images, and three-dimensional coordinates of a corresponding point can be obtained by calculating a correspondence between pixels. Stereo correction is performed on the stereo images according to pre-calibrated camera parameters, so that search of the corresponding point only needs to be performed on a horizontal line on which the pixel point is located. As shown in FIG. 5(a), the left part is a reference image, the right part is a captured target image, and an arrow in the figure is a search direction of the corresponding point. By means of this method, when texture features on a target surface are not rich enough, it is difficult to establish a correct point correspondence, and it becomes very difficult to obtain accurate stereo matching.

It may be understood that there are a plurality of methods for performing matching by using the captured speckle patterns and the prestored reference speckle patterns, such as a sum of squared differences (SSD) similarity method and an NCC matching method. The matching method is not limited herein. In this embodiment, a spatial-temporal stereo matching method is adopted by adding temporal information into a stereo matching method. By establishing a point correspondence between the reference image and the captured target image, a depth of the target object is calculated by using a triangulation principle. As shown in FIG. 5(b), the left parts are reference images, the right parts are captured target images, and an arrow in the figure is a search direction of the corresponding point. The emission module 11 emits a plurality of speckle patterns that change temporally to the target object, and stereo matching is performed according to a spatial-temporal stereo matching principle by using three-dimensional windows. The three-dimensional windows contain rich image information. Therefore, even if a radius of a matching window is very small (for example, 5×5, or even 3×3), a compact disparity map can be obtained by using the NCC matching method. The NCC matching is to calculate a matching degree between a speckle pattern and a prestored reference speckle pattern based on an NCC measurement formula by using grayscales of the speckle pattern and the prestored reference speckle pattern. A formula of the method for calculating the NCC matching degree between the three-dimensional windows is as follows:

$$ncc(x, y, d) = \frac{\sum_{i=1}^{K}\sum_{u,v\in\Omega(x,y)}(I_{i,O}(u,v)-\bar{I}_O)(I_{i,R}(u+d,v)-\bar{I}_R)}{\sqrt{\sum_{i=1}^{K}\sum_{u,v\in\Omega(x,y)}(I_{i,O}(u,v)-\bar{I}_O)^2 \sum_{i=1}^{K}(I_{i,R}(u+d,v)-\bar{I}_R)^2}} \quad (1)$$

where d is a disparity value, i is an image sequence index, ncc(x, y, d) represents an NCC value between image blocks in K different temporal speckle images centered around a pixel point (x, y) in reference speckle images $I_{i,R}$ and image blocks in K different temporal speckle images centered around a pixel point (x-d, y) in captured speckle images $I_{i,O}$, $\Omega(x, y)$ is a neighborhood centered around (x, y), and $\bar{I}_O$ and $\bar{I}_R$ are respectively average pixel grayscale values in three-dimensional windows of the reference speckle images and the captured speckle images.

To improve a matching speed, a pyramid search strategy is adopted, to implement coarse-to-fine matching. By using a three-layer pyramid, a width or height of an image at a current layer is ½ of a width or height of an image at a next layer. Mismatching points are eliminated through bidirectional matching. That is, it is assumed that a corresponding point PO is found in a captured target speckle image for a pixel point PR in a reference speckle image, and then reverse matching is performed in the reference image for the point PO in the target captured speckle image, to obtain a corresponding point PR1. The process is considered as mismatching if (PR−PR1≤1) is not met A disparity map obtained based on NCC is of a pixel level, and to obtain matching accuracy of a sub-pixel level, two pixels that are obtained based on NCC and that are at a center of matched positions are subdivided, where a subdivision interval is 0.1 pixel to obtain 21 positions. Subsequently, the 21 positions are searched for a position with a highest NCC score by using NCC similarities, and the position with the highest NCC score is a final sub-pixel matching result. By using this method, matching accuracy of 1/10 pixel can be obtained theoretically.

Figure 6:
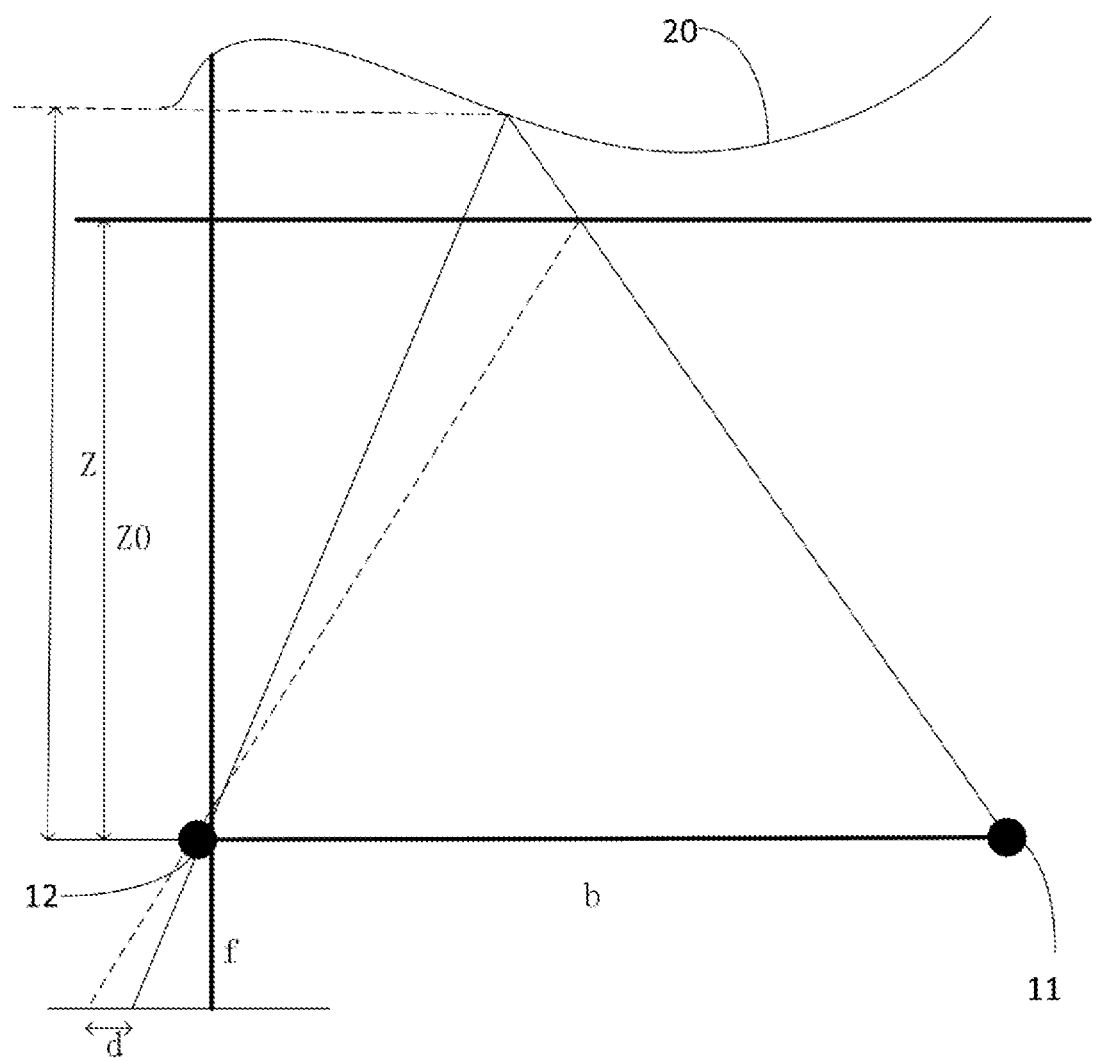
FIG. 6 is a schematic diagram of a principle of calculating depth values according to sequential offsets based on previous and next frames, according to an embodiment of the specification.

As shown in FIG. 6, the emission module 11 emits speckle patterns to the target object, and the acquisition module 12 acquires the reflected speckle patterns reflected by the target object. After a disparity map is obtained through speckle matching, the depth values of the pixel points can be calculated according to disparities of the pixel points in the disparity map by using a triangulation method, and an expression is as follows:

$$Z = \frac{Z_0}{1 + \frac{Z_0}{f \times b} \times d}$$

where d is a disparity value, b is a length of a baseline from a light source of the emission module to a camera of the acquisition module, $Z_0$ is a distance between a plane on which the emission module and the acquisition module are located and a reference plane, f is a focal length of the camera, and Z is a depth value of a pixel point. It may be understood that the emission module and the acquisition module are generally arranged on the same baseline, and a plane on which the emission module and the acquisition module are located is actually a plane on which the baseline is located.

Figure 7:
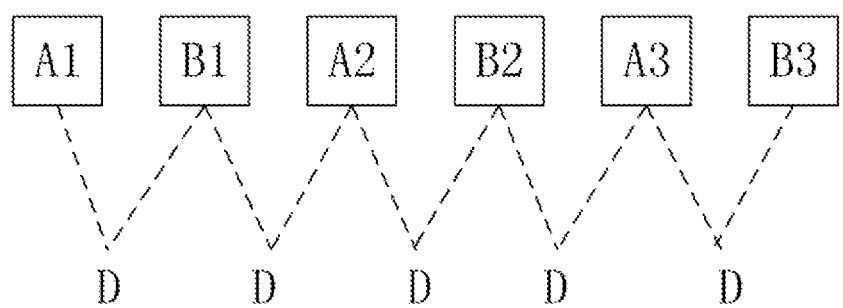
FIG. 7 is a schematic diagram of sequentially acquiring images based on previous and next frames, according to an embodiment of the specification.

It may be understood that in the foregoing embodiment, a depth image of the target object 20 is calculated by acquiring a plurality of frames of images. For example, the emission module 11 sequentially emits a temporal speckle image A and a temporal speckle image B to the target object 20, that is, the two temporal speckle images are temporally emitted to the target object 20 in an order of A1, B1, A2, B2, A3, and B3. If a depth image D is outputted by A+B sequentially, that is, a frame of the depth image is calculated based on A1 and B1, a frame of image is calculated based on A2 and B2, and a frame of image is calculated based on A3 and B3. There are three frames of images in total. Therefore, a frame rate of the depth image is reduced by half compared with a frame rate for acquisition of the speckle image. However, in an embodiment, a front-back-frame sequential manner may be used. In this way, a quantity of acquisition frames will not be reduced. A front-back-frame sequential acquisition method according to an embodiment of the specification shown in FIG. 7 is to calculate a frame of the depth image based on a previous frame and a next frame. A frame of the depth image is calculated based on A1 and B1, and then a frame of depth image is calculated based on B1 and A2, and so on. The first frame A1 has no corresponding depth image, but each subsequent frame of speckle image has a corresponding depth image, so that a measurement frame rate is not reduced.

It may be understood that the foregoing two methods are merely exemplarily described based on an improvement of the software of the control and processing units, and/or an improvement of a combination of the hardware and the software of the depth imaging device. Other methods that can implement the concept of the specification, that is, methods in which the emission module emits at least two speckle patterns that change temporally to a target object, temporal information is added based on a stereo matching method, and stereo matching is performed according to a spatial-temporal stereo matching principle by using three-dimensional windows, should all fall within the protection scope of the specification.

Figure 8:
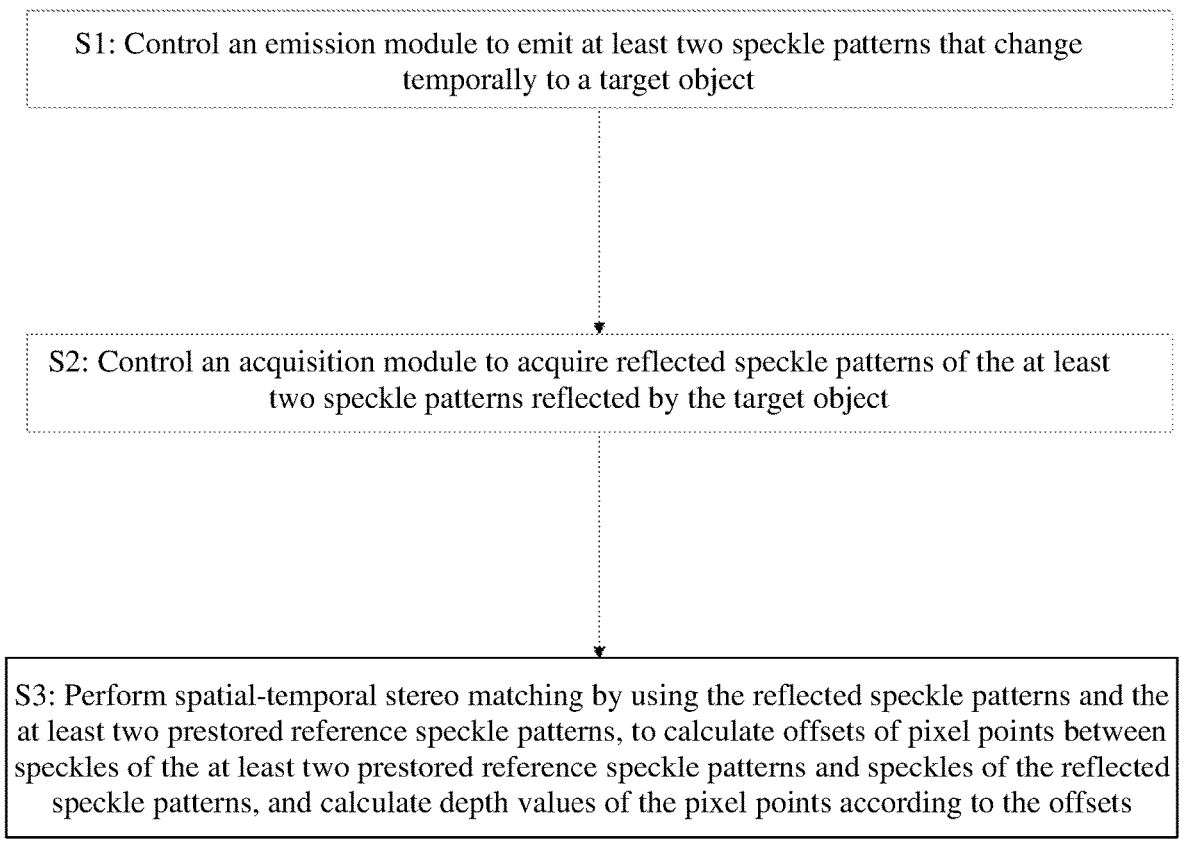
FIG. 8 is a schematic diagram of a depth imaging method, according to an embodiment of the specification.

Based on the depth imaging device based on temporal speckles disclosed in the foregoing embodiments, the specification further provides a corresponding depth imaging method. FIG. 8 shows a depth imaging method based on temporal speckles, according to an embodiment of the specification. The method includes the following steps.

S1: Controlling an emission module to emit at least two speckle patterns that change temporally to a target object.

In an embodiment, the emission module includes a VCSEL array, a lens, and a DOE. Each sub-array in the VCSEL array emits a different speckle pattern, thereby generating temporal speckle patterns.

In another embodiment, the emission module includes a VCSEL array, a lens, a DOE, and an actuator. The actuator is connected to any one of the VCSEL array, the lens, or the DOE, to move the VCSEL array, the lens, or the DOE in a single direction or a plurality of directions, thereby generating speckle patterns that change temporally.

S2: Controlling an acquisition module to acquire the reflected speckle patterns of the at least two speckle patterns reflected by the target object.

S3: Performing spatial-temporal stereo matching by using the reflected speckle patterns and at least two prestored reference speckle patterns, to calculate offsets of pixel points between speckles of the at least two prestored reference speckle patterns and speckles of the reflected speckle patterns, and calculating depth values of the pixel points according to the offsets.

In an embodiment of the specification, the plurality of discrete sub-light source arrays in the emission module are controlled to be independently turned on or to be synchronously turned on, so that the at least two speckle patterns that change temporally are emitted to the target object. The specific implementation is as described above, and details are not described herein again.

In another embodiment of the specification, after a light beam emitted from the light source array of the emission module is controlled to be deflected, the at least two speckle patterns that change temporally are emitted to the target object. The specific implementation is as described above, and details are not described herein again.

The control and processing device performs matching on the reference speckle patterns and the captured speckle patterns by using an NCC matching method, to calculate to obtain a disparity map. An expression of the NCC matching calculation method is as follows:

$$ncc(x, y, d) = \frac{\sum_{i=1}^{K} \sum_{u,v \in \Omega(x,y)} (I_{i,O}(u, v) - \overline{I}_O)(I_{i,R}(u+d, v) - \overline{I}_R)}{\sqrt{\sum_{i=1}^{K} \sum_{u,v \in \Omega(x,y)} (I_{i,O}(u, v) - \overline{I}_O)^2 \sum_{i=1}^{K} (I_{i,R}(u+d, v) - \overline{I}_R)^2}}$$

where d is a disparity value, i is an image sequence index, ncc(x, y, d) represents an NCC value between image blocks in K different temporal speckle images centered around a pixel point (x, y) in reference speckle images $I_{i,R}$ and image blocks in K different temporal speckle images centered around a pixel point (x-d, y) in captured speckle images $I_{i,O}$, $\Omega(x, y)$ is a neighborhood centered around (x, y), and $\bar{I}_O$ are average pixel grayscale values in three-dimensional windows of the reference speckle images and $\bar{I}_R$ are average pixel grayscale values in three-dimensional windows of the captured speckle images.

After the disparity map is obtained according to the speckle matching, the depth values of the pixel points can be calculated according to disparities of the pixel points in the disparity map by using a triangulation method, and an expression is as follows:

$$Z = \frac{Z_0}{1 + \frac{Z_0}{f \times b} \times d}$$

where d is a disparity value, b is a length of a baseline from a light source of the emission module to a camera of the acquisition module, $Z_0$ is a distance between a plane on which the emission module and the acquisition module are located and a reference plane, f is a focal length of the camera, and Z is a depth value of a pixel point.

An embodiment of the specification further provides a control device, including a processor and a storage medium configured to store a computer program, where the processor is configured to at least perform the foregoing method when executing the computer program.

An embodiment of the specification further provides a storage medium, configured to store a computer program, where the computer program, when being executed, at least performs the foregoing method.

An embodiment of the specification further provides a processor, where the processor, when executing a computer program, at least performs the foregoing method.

The storage medium may be implemented by any type of volatile or non-volatile storage device, or a combination thereof. The non-volatile memory may be a read-only memory (ROM), a programmable ROM (PROM), an erasable PROM (EPROM), an electrically EPROM (EEPROM), a ferromagnetic random access memory (FRAM), a flash memory, a magnetic surface memory, a compact disc, or a compact disc ROM (CD-ROM); and the magnetic surface memory may be a magnetic disk storage or a magnetic tape storage. The volatile memory may be a random access memory (RAM), used as an external cache. Through exemplary but non-limitative descriptions, RAMs in lots of forms may be used, for example, a static RAM (SRAM), a synchronous SRAM (SSRAM), a dynamic RAM (DRAM), a synchronous DRAM (SDRAM), a double data rate SDRAM (DDR SDRAM), an enhanced SDRAM (ESDRAM), a SyncLink DRAM (SLDRAM), and a direct Rambus RAM (DR RAM). The storage medium according to this embodiment of the specification includes, but not limited to, above and any other suitable types of memories.

In the several embodiments provided in the specification, it should be understood that the disclosed system and method may be implemented in other manners. The described device embodiments are merely exemplary. For example, the unit division is merely logical function division and may be other division during actual implementation. For example, multiple units or components may be merged or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in the same place, or may be distributed to a plurality of network units. Some or all of the units need to be selected according to actual requirements to implement the purpose of the solution of the embodiments.

In addition, functional units in the embodiments of the specification may be all integrated in a second processing unit, each unit is separately used as a unit, or two or more units are integrated in a unit. The integrated unit may be implemented in a form of hardware, or may be implemented in form of hardware plus a software functional unit.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a portable storage device, a ROM, a RAM, a magnetic disk, or a compact disc.

Alternatively, when the integrated module in the specification is implemented in the form of a software functional module and sold or used as an independent product, the integrated module may be stored in a computer-readable storage medium. Based on such an understanding, the technical solutions of the embodiments of the specification essentially, or the part contributing to the existing technologies may be implemented in a form of a software product. The computer software product is stored in a storage medium and includes several instructions for instructing a computer device (which may be a personal computer, a server, a network device, or the like) to perform all or some of the methods described in the embodiments of the specification. The foregoing storage medium includes: any medium that can store program code, such as a portable storage device, a ROM, a RAM, a magnetic disk, or a compact disc.

The methods disclosed in the method embodiments provided in the specification may be combined with each other arbitrarily if there is no conflict, to obtain a new method embodiment.

The features disclosed in the product embodiments provided in the specification may be combined with each other arbitrarily if there is no conflict, to obtain a new product embodiment.

The features disclosed in the method or device embodiments provided in the specification may be combined with each other arbitrarily if there is no conflict, to obtain a new method embodiment or device embodiment.

The foregoing contents are detailed descriptions of the specification with reference to specific exemplary embodiments, and it should not be considered that the specific implementation of the specification is limited to these descriptions. A person skilled in the art, to which the specification belongs, may further make some equivalent replacements or obvious variations without departing from the concept of the specification. Performance or functions of the replacements or variations are the same as those in the specification, and all the replacements or variations should be considered as falling within the protection scope of the specification.

What is claimed is:

1. A depth imaging method, comprising:
controlling an emission module comprising a light emitting device to emit at least two speckle patterns that change temporally to a target object;
controlling an acquisition module comprising a light sensor to acquire reflected speckle patterns of the at least two speckle patterns reflected by the target object; and
performing spatial-temporal stereo matching by using the reflected speckle patterns and at least two prestored reference speckle patterns, to calculate offsets of pixel points between speckles of the at least two prestored reference speckle patterns and speckles of the reflected speckle patterns, and calculating depth values of the pixel points according to the offsets, wherein
the offsets of the pixel points are calculated according to normalized cross correlation (NCC) matching using a formula of $$ncc(x, y, d) = \frac{\sum_{i=1}^{K} \sum_{u,v \in \Omega(x,y)} (I_{i,O}(u, v) - \bar{I}_O)(I_{i,R}(u+d, v) - \bar{I}_R)}{\sqrt{\sum_{i=1}^{K} \sum_{u,v \in \Omega(x,y)} (I_{i,O}(u, v) - \bar{I}_O)^2 - \sum_{i=1}^{K} (I_{i,R}(u+d, v) - \bar{I}_R)^2}}$$

wherein d is a disparity value, i is an image sequence index, ncc(x, y, d) represents an NCC value between image blocks in K different temporal speckle images centered around a pixel point (x, y) in reference speckle images $I_{i,R}$ and image blocks in K different temporal speckle images centered around a pixel point (x-d, y) in captured speckle images $I_{i,O}$, $\Omega(x, y)$ is a neighborhood centered around (x, y), $\bar{I}_O$ is average pixel grayscale values in three-dimensional windows of the reference speckle images, and $\bar{I}_R$ is average pixel grayscale values in three-dimensional windows of the captured speckle images; and
the depth values of the pixel points are calculated based on the offsets using a triangulation of $$Z = \frac{Z_0}{1 + \frac{Z_0}{f \times b} \times d}$$

wherein b is a length of a baseline from a light source of the emission module to a camera of the acquisition module, $Z_0$ is a distance between a plane on which the emission module and the acquisition module are located and a reference plane, f is a focal length of the camera, and Z is a depth value of a pixel point.

2. The method according to claim 1, wherein
the light emitting device comprises a light source array comprising a plurality of discrete sub-light source arrays, and
the discrete sub-light source arrays are grouped, and groups of the discrete sub-light source arrays are turned on independently, or the discrete sub-light source arrays are turned on synchronously, to emit the at least two speckle patterns that change temporally to the target object.

3. The method according to claim 1, wherein
light beams emitted from the emission module are deflected, to generate the at least two speckle patterns that change temporally.

4. The method according to claim 1, wherein the speckle patterns are acquired by using a front-back-frame sequential acquisition method to calculate the depth values of the pixel points.

5. A depth imaging device, comprising:
an emission module comprising a light emitting device configured to emit at least two speckle patterns that change temporally to a target object;
an acquisition module comprising a light sensor configured to acquire reflected speckle patterns of the at least two speckle patterns reflected by the target object; and
a control and processing device, respectively connected to the emission module and the acquisition module, and configured to perform spatial-temporal stereo matching by using the reflected speckle patterns and at least two reference speckle patterns, to calculate offsets of pixel points between speckles of the at least two reference speckle patterns and speckles of the reflected speckle patterns, and calculate depth values of the pixel points according to the offsets, wherein
the offsets of the pixel points are calculated according to normalized cross correlation (NCC) matching using a formula of $$ncc(x, y, d) = \frac{\sum_{i=1}^{K} \sum_{u,v \in \Omega(x,y)} (I_{i,O}(u, v) - \bar{I}_O)(I_{i,R}(u+d, v) - \bar{I}_R)}{\sqrt{\sum_{i=1}^{K} \sum_{u,v \in \Omega(x,y)} (I_{i,O}(u, v) - \bar{I}_O)^2 \sum_{i=1}^{K} (I_{i,R}(u+d, v) - \bar{I}_R)^2}}$$

wherein d is a disparity value, i is an image sequence index, ncc(x, y, d) represents an NCC value between image blocks in K different temporal speckle images centered around a pixel point (x, y) in reference speckle images $I_{i,R}$ and image blocks in K different temporal speckle images centered around a pixel point (x-d, y) in captured speckle images $I_{i,O}$, $\Omega(x, y)$ is a neighborhood centered around (x, y), $\bar{I}_O$ is average pixel grayscale values in three-dimensional windows of the reference speckle images, and $\bar{I}_R$ is average pixel grayscale values in three-dimensional windows of the captured speckle images; and
the depth values of the pixel points are calculated based on the offsets using a triangulation of $$Z = \frac{Z_0}{1 + \frac{Z_0}{f \times b} \times d}$$

wherein b is a length of a baseline from a light source of the emission module to a camera of the acquisition module, $Z_0$ is a distance between a plane on which the emission module and the acquisition module are located and a reference plane, f is a focal length of the camera, and Z is a depth value of a pixel point.

6. The device according to claim 5, wherein
the light emitting device comprises a light source array, and the light source array comprises a plurality of discrete sub-light source arrays, and
the discrete sub-light source arrays are grouped, and groups of the discrete sub-light source arrays are turned on independently, or the discrete sub-light source arrays are turned on synchronously, to emit the at least two speckle patterns that change temporally.

7. The device according to claim 5, further comprising: a light beam deflection unit connected to the emission module and configured to deflect light beams emitted from a light source array of the emission module to generate the at least two speckle patterns that change temporally.

8. The device according to claim 7, wherein
the light emitting device comprises a light source and an optical element connected, and the optical element comprises a lens or a diffractive optical element (DOE); and
the light beam deflection unit is connected to one of the light source, the lens, or the DOE, and is configured to move or deflect the light source, the lens, or the DOE in a single direction or multiple directions.

9. A non-transitory computer-readable storage medium storing a computer program, which, when executed by a processor, causes the processor to perform operations comprising:
controlling an emission module comprising a light emitting device to emit at least two speckle patterns that change temporally to a target object;
controlling an acquisition module comprising a light sensor to acquire reflected speckle patterns of the at least two speckle patterns reflected by the target object; and
performing spatial-temporal stereo matching by using the reflected speckle patterns and at least two reference speckle patterns, to calculate offsets of pixel points between speckles of the at least two reference speckle patterns and speckles of the reflected speckle patterns, and calculating depth values of the pixel points according to the offsets, wherein
the offsets of the pixel points are calculated according to normalized cross correlation (NCC) matching using a formula of $$ncc(x, y, d) = \frac{\sum_{i=1}^{K} \sum_{u,v \in \Omega(x,y)} (I_{i,O}(u, v) - \bar{I}_O)(I_{i,R}(u+d, v) - \bar{I}_R)}{\sqrt{\sum_{i=1}^{K} \sum_{u,v \in \Omega(x,y)} (I_{i,O}(u, v) - \bar{I}_O)^2 \sum_{i=1}^{K} (I_{i,R}(u+d, v) - \bar{I}_R)^2}}$$

wherein d is a disparity value, i is an image sequence index, ncc(x, y, d) represents an NCC value between image blocks in K different temporal speckle images centered around a pixel point (x, y) in reference speckle images $I_{i,R}$ and image blocks in K different temporal speckle images centered around a pixel point (x-d, y) in captured speckle images $I_{i,O}$, $\Omega$(x, y) is a neighborhood centered around (x, y), $\bar{I}_O$ is average pixel grayscale values in three-dimensional windows of the reference speckle images, and $\bar{I}_R$ is average pixel grayscale values in three-dimensional windows of the captured speckle images; and
the depth values of the pixel points are calculated based on the offsets using a triangulation of $$Z = \frac{Z_0}{1 + \frac{Z_0}{f \times b} \times d}$$

wherein b is a length of a baseline from a light source of the emission module to a camera of the acquisition module, $Z_0$ is a distance between a plane on which the emission module and the acquisition module are located and a reference plane, f is a focal length of the camera, and Z is a depth value of a pixel point.

10. The non-transitory computer-readable storage medium of claim 9, wherein
the light emitting device comprises a light source array comprising a plurality of discrete sub-light source arrays, and
the discrete sub-light source arrays are grouped, and groups of the discrete sub-light source arrays are turned on independently, or the discrete sub-light source arrays are turned on synchronously, to emit the at least two speckle patterns that change temporally to the target object.

11. The non-transitory computer-readable storage medium of claim 9, wherein light beams emitted from the emission module are deflected, to generate the at least two speckle patterns that change temporally.

12. The non-transitory computer-readable storage medium of claim 9, wherein the speckle patterns are acquired by using a front-back-frame sequential acquisition method to calculate the depth values of the pixel points.

13. The non-transitory computer-readable storage medium of claim 9, wherein
the light emitting device comprises a light source and an optical element connected, and the optical element comprises a lens or a diffractive optical element (DOE); and
a light beam deflection unit is connected to one of the light source, the lens, or the DOE, and is configured to move or deflect the light source, the lens, or the DOE in a single direction or multiple directions.

* * * * *